July 25, 1933.   C. C. FARMER   1,919,424
FLUID PRESSURE BRAKE
Filed Oct. 22, 1931   2 Sheets-Sheet 1
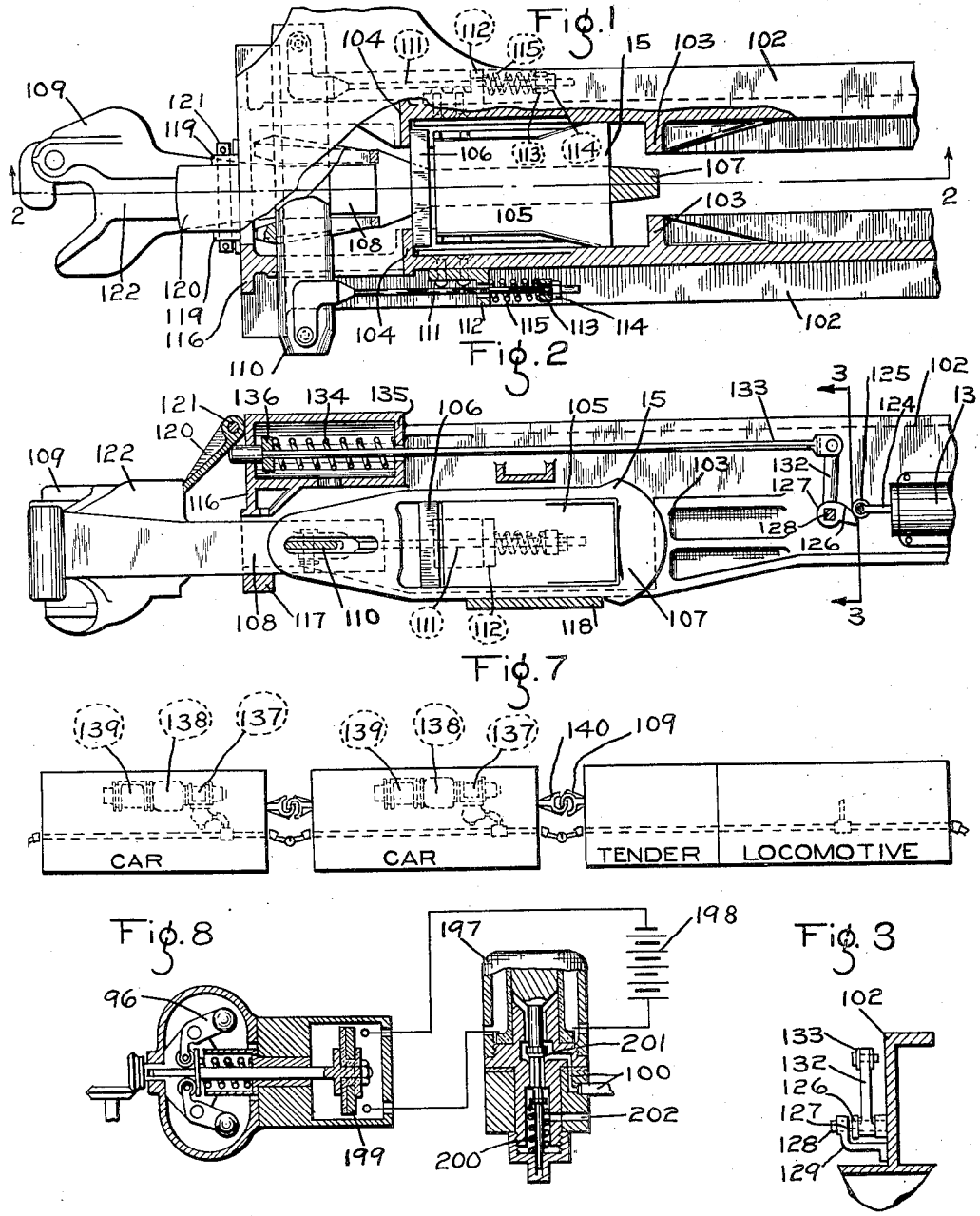
INVENTOR.
CLYDE C FARMER
By *Wm. M. Cady*
ATTORNEY.

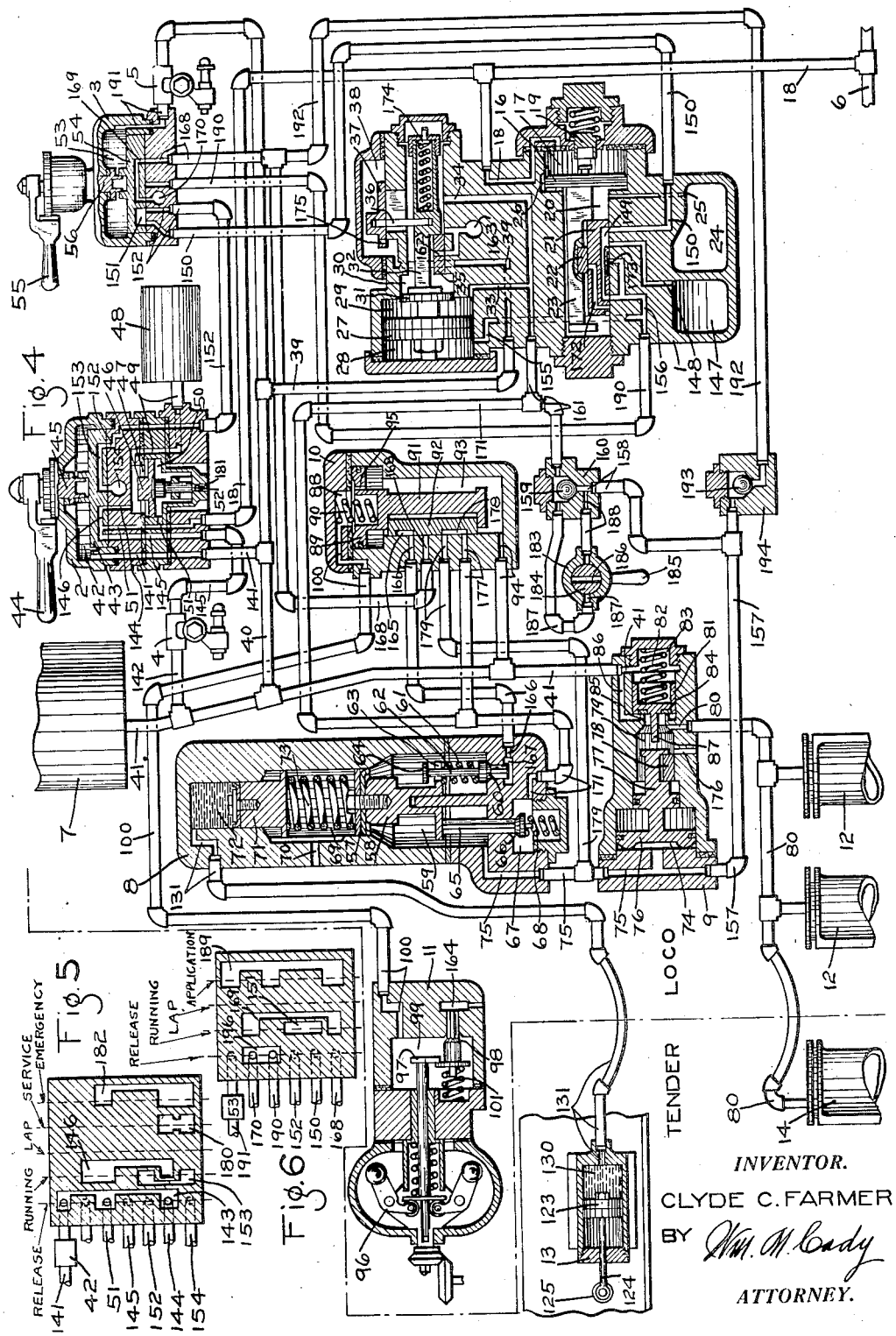

Patented July 25, 1933

1,919,424

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 22, 1931. Serial No. 570,287.

This invention relates to brake systems for trains and more particularly to fluid pressure brake systems adapted for the handling of long trains.

It is well known that when the usual brake valve device of a fluid pressure brake system on a train is turned to a brake application position, the brakes apply serially from the front end of the train toward the rear end of the train, that is to say, the locomotive and tender brakes will apply first and then the brakes on the following cars will apply serially toward the rear end of the train. As a result of this serial braking action, the retardation of the locomotive, tender and cars at the front end of the train begins before the brakes on the cars at the rear end of the train become effective.

There is a certain amount of slack or lost motion in the usual coupling mechanisms between the adjacent ends of adjacent cars of a train, and by reason of the fact, as above explained, that the locomotive, tender and cars at the front end of the train begin to decelerate before the cars at the rear end of the train, if this slack is stretched out at the time an application of the brakes is initiated, the rear cars of the train run in against the slower moving cars and tender at the front end of the train, tending to cause shocks.

Since the locomotive and tender brakes of the train apply first when an application of the brakes is initiated, the locomotive and tender act to impede the forward movement of the cars of the train and, due to this, increases the magnitude of any shocks which may be caused by the gathering of the slack in the train to such an extent that damage or derailment of some of the cars may result.

The principal object of my invention is to provide an improved brake system for a train which, after an application of the brakes has been initiated, will function to so control the locomotive and tender brakes that the locomotive and tender will not act to decelerate the cars of the train while the train is being brought to a stop.

Another object of my invention is to provide an improved train brake system which, in effecting an application of the train brakes, functions automatically to vary the braking force of the locomotive and tender brakes so that the locomotive and tender will not act to retard the forward movement of the cars until the train is decelerated to some predetermined slow speed or is at substantially a stop and then functions to apply the locomotive and tender brakes with full force.

Another object is to provide a train brake system, which in functioning to effect an application of the brakes, controls the braking action on the locomotive and tender according to relative longitudinal movement between two vehicles or units of the train until such time as the train is decelerated to a predetermined low speed and then controls the braking action on the locomotive and tender regardless of relative longitudinal movement between the vehicles or units.

A further and more specific object is to provide a train brake system embodying means operative automatically for varying the braking force on a front vehicle of the train according to relative longitudinal movement between said vehicle and an adjacent vehicle coupled thereto and embodying means operated when the train is decelerated to a predetermined slow speed for rendering the first mentioned means ineffective to vary the braking power on the front vehicle and to cause an application of the brakes of the head vehicle to be effected with full force.

Other objects and advantages will appear in the following more detailed description of the invention.

In the accompanying drawings; Fig. 1 is a plan view, partly in section, of a portion of the tender of a lomomotive and embodying a portion of my invention, the coupling mechanism being shown under heavy draft strain; Fig. 2 is a longitudinal sectional view of the same taken on the line 2—2 of Fig. 1, some of the parts being shown in side elevation to more clearly illustrate certain details; Fig. 3 is a cross sectional view through one of the draft sills, taken on the line 3—3 of Fig. 2; Fig. 4 is a diagrammatic view, mainly in section, of the portion of the brake system carried by the locomotive; Figs. 5 and 6 are development views of the automatic brake valve device and independent brake valve device, respectively; Fig. 7 is a diagrammatic view of a train comprising a locomotive and two cars, only a portion of the train brake system being shown; and Fig. 8 is a diagrammatic sectional view of a modification of the speed controlled mechanism of the system.

As shown in Fig. 4 of the drawings, the locomotive equipment may comprise a distributing valve device 1, an automatic brake valve device 2, an independent brake valve device 3, a feed valve device 4, a reducing valve device 5, a brake pipe 6, a main reservoir 7, a regulating valve device 8, a relay valve device 9, a control valve device 10, a speed controlled valve device 11 and brake cylinders 12.

The tender equipment, as shown in Figs. 2 and 4 may comprise a controlling device 13, a brake cylinder 14 and a coupling mechanism 15. As will hereinafter more fully appear, the operation of the controlling device 13 is controlled by the operation of the coupling mechanism 15 and is adapted to control the operation of the regulating valve device 8 of the locomotive equipment.

The relay valve device 9 is for the purpose of controlling the pressure of fluid in the locomotive brake cylinders 12 and the tender brake cylinder 14 and is controlled by the regulating valve device 8.

The control valve device 10 is for the purpose of rendering the regulating valve device 8 either effective or ineffective to control the operation of the relay valve device 9 and is controlled by the speed controlled valve device 11 which operates according to the speed of the locomotive.

The distributing valve device 1 may be of the usual type comprising an application portion and an equalizing portion. The equalizing portion comprises a piston 16 at one side of which is a chamber 17 to which the brake pipe 6 is connected through a pipe and passage 18, said chamber containing a spring-pressed stop 19 which is adapted to engage the piston 16. At the other side of the piston 16 is a chamber 20 containing a main slide valve 21 and an auxiliary slide valve 22 which are adapted to be operated by the piston 16 through the medium of a stem 23. The valve chamber 20 is in constant communication with a pressure chamber 24 through a passage 25, and when the piston 16 is in brake releasing position, as shown in Fig. 4, is connected to the piston chamber 17 by way of a feed groove 26 around the piston.

The application portion of the distributing valve device comprises a piston 27, at one side of which is a chamber 28. At the other side of the piston 27 there are chambers 29 and 30 which are separated by a baffle piston 31 carried by the stem 32 of the piston. While chambers 29 and 30 are separated by the baffle piston, they are nevertheless connected by way of passages 33 and 34, the passage 33 being open to the chamber 29 and the passage 34 being open to the chamber 30. Contained in the chamber 30 is an exhaust slide valve 35 which is adapted to be operated by the piston 27 through the medium of the piston stem 32. Secured to and projecting upwardly from the piston stem 32 is a pin 36 which operatively engages a slide valve 37 contained in a chamber 38 which is connected to the main reservoir 7 through a passage and pipe 39, a pipe 40 and a main reservoir pipe 41.

The automatic brake valve device 2 may be of the usual type and comprises a casing having a chamber 42 containing a rotary valve 43 adapted to be turned to its various brake controlling positions by a handle 44 operatively engaging the stem 45 of the valve. The usual brake pipe discharge valve mechanism is disposed in the brake valve casing and comprises an equalizing piston 46 having at one side a chamber 47 which is connected to an equalizing reservoir 48 through a passage and pipe 49. At the other side of the piston 46 there is a chamber 50 which is connected to the brake pipe 6 through a passage 51 and pipe 18, said chamber 50 containing a brake pipe discharge valve 52 adapted to be operated by the piston 46.

The independent brake valve device 3 may be of the usual type and comprises a casing having a chamber 53 containing a rotary valve 54 adapted to be turned to its various locomotive brake controlling positions through the medium of a handle 55 operatively engaging the stem 56 of the valve.

The regulating valve device 8 may comprise a casing in which a piston 57 is operatively mounted, said piston having a stem 58 which is contained in a chamber 59 at one side of the piston. Also contained in the chamber 59 is a release valve 60 which is urged toward its seat by the action of a coil spring 61 interposed between the valve and the end of the piston stem. The valve 60 is provided with a stem 62 which extends through an opening in a flange 63 of the stem, and at its end is provided with a head 64 with which the piston stem engages to unseat the valve. The end of the piston stem is adapted to engage the end of the fluted stem 65 of a fluid pressure supply valve 66 which is contained in a valve chamber 67 and which is urged toward its seat by the action of a coil spring 68.

At the other side of the piston 57, there is a chamber 69 which is open to the atmosphere through a port 70. Slidably mounted in the casing is a plunger piston 71 which is subject on one side to the pressure of a liquid contained in a chamber 72 in the casing. Contained in the chamber 69 and interposed between and engaging the pistons 57 and 71 is a regulating spring 73 which is for the purpose of controlling the operation of the piston 57.

The relay valve device 9 may comprise a casing having a chamber 74 which is connected to the chamber 59 in the regulating valve device 8 by way of passages and pipe 75. Contained in chamber 74 is a piston 76 having a stem 77 adapted to operate a slide valve 78 contained in a chamber 79 which is constantly connected to the locomotive brake cylinders 12 and tender brake cylinder 14 through a passage and pipe 80. Slidably mounted in the casing is a piston valve 81 which is subject on one side to the pressure of a coil spring 82 contained in a chamber 83 and to the pressure of fluid supplied from the main reservoir 7 to the chamber 83 by way of main reservoir pipe and passage 41. The piston valve is provided with a gasket valve 84 which is adapted to seat on an annular seat rib 85 formed on the casing, the outer seated area of the valve being connected to the passage 41 through a passage 86. The valve piston is also provided with a projection 87 which extends into the valve chamber 79 and is adapted to be operatively engaged by the end of the relay piston stem 77.

The control valve device 10 may comprise a casing having a chamber 88 containing a piston 89 which is subject on one side to the action of a coil spring 90 contained in the piston chamber 88. The piston 89 is provided with a stem 91 through which the piston is adapted to operate a slide valve 92 contained in a valve chamber 93 to which the main reservoir 7 is open by way of main reservoir pipe 41 and a branch pipe and passage 94. A port 95 of small diameter in the piston establishes communication between the valve chamber 93 and piston chamber 88.

The governor valve device 11 may be of the centrifugal type, having a governor portion 96 adapted to be rotated according to the speed of the train. The governor portion 96 is adapted to shift a crosshead 97 to control the operation of an exhaust valve 98 contained in a valve chamber 99 connected to the piston chamber 88 in the control valve device 10 by way of passages and pipe 100, said valve 98 being subject to the pressure of a coil spring 101 also contained in the valve chamber 99. This spring opposes the unseating of the valve 98.

As shown in Figs. 1 and 2, the coupling mechanism of the tender may comprise spaced draft sills 102 having rear stop lugs 103 and front stop lugs 104, and may also comprise a shock absorbing mechanism 105 which is interposed between the draft sills. The rear end of the shock absorbing mechanism is adapted to abut the rear stop lugs 103 and the forward end abuts a follower plate 106 which in turn is adapted to abut the front stop lugs 104. The shock absorbing mechanism is surrounded by a yoke 107, to the forward end of which yoke, the coupler shank 108 of a coupler 109 is secured by means of a draft key 110 extending transversely of the tender through openings formed in the draft sills, yoke and coupler shank, the openings in the draft sills and in the yoke being elongated in the direction of the length of the tender to provide for the proper operation of the several movable parts of the draft rigging.

Secured to each end of the draft key 110 and extending rearwardly therefrom, is a rod 111 which passes through an opening in a lug 112 secured to the outside of a draft sill 102. The rear end of this rod is provided with a follower plate 113 and a nut 114, which engages the follower plate and which has screw-threaded connection with the rod. Interposed between and engaging the lug 112 and the follower plate 113 is a spring 115. The springs 115 are of such value that, when the draft rigging is fully released, they will, through the medium of the rods 111 and draft key 110, maintain the end of the coupler shank 108 in engagement with the follower plate 106. It will here be understood that the force of the springs 115 is not sufficient to compress the shock absorbing mechanism 105 or to materially affect the capacity of the shock absorbing mechanism.

At the outer end of the draft sills 102, a striking plate 116 is provided which, in the present embodiment of the invention is shown as being integral with the sills.

The coupler shank 108 is supported in the usual manner by a carry iron 117 which may be either integral with or removably secured to the bottoms of the draft sills. The shock absorbing mechanism 105 and draft yoke 107 are supported in the usual manner by a plate 118 which is secured to the bottoms of the draft sills.

Above the coupler 109, the striking plate 116 is provided with outwardly extending spaced lugs 119 between which a member 120 is pivotally mounted on a pin 121, carried by the lugs, to swing toward and away from the striking plate. This member extends some distance below the pin 119 and its lower edge portion is adapted to be operatively engaged by the rear face of the usual coupler horn 122. The portion of the member which is adapted to be engaged by the coupler horn, is curved as shown in Fig. 1, so that when the coupler moves sidewise, as in rounding a curve, the member will not be moved from its proper position by the coupler horn.

The controlling device 13 of the tender equipment may comprise a cylinder which is secured to one of the draft sills, and contains a plunger piston 123 having a steam 124 extending through the non-pressure head of the cylinder. The outer end of this stem is provided with a roller 125 which is constantly in engagement with the cam surface 126 of a cam 127 secured to a shaft 128 rotatably mounted in one of the draft sills and in a bracket 129 secured to the sill. At one side of the plunger piston is a chamber 130 which is connected to the chamber 72 in the regulating valve device 8 of the locomotive equipment through passages and pipe 131. The chambers 72 and 130 and pipe connections 131 are filled with liquid.

The cam 127, when rotated in a counter-clockwise direction, forces the plunger piston 123 inwardly, which in turn, forces liquid from the chamber 130 and pipe 131 into the chamber 72 of the regulating valve device 8. The liquid thus forced into the chamber 72 causes the regulating plunger piston 71 to move inwardly, compressing the regulating spring 73. When the cam is rotated in the opposite direction, its pressure on the plunger 123 is relieved, consequently the regulating plunger piston 71 will be correspondingly relieved of the pressure of the liquid in chamber 72. The regulating spring spring 73 will now act to move the regulating plunger piston 71 outwardly, and as the piston is thus moved, it forces liquid from the chamber 72 and pipe 131 into the chamber 130, causing the control plunger piston 123 to move outwardly, thus maintaining the roller 125 in engagement with the cam surface 126 of the cam.

For the purpose of rotating the cam 127, a mechanism is provided which comprises an operating arm 132 which is secured to the cam shaft 128 and which has its free end pivotally connected to the inner end of the plunger rod 133 slidably mounted on the draft sills 102. This rod extends longitudinally of the tender and its outer end portion extends through and beyond the outer face of the striking plate 116 and is maintained in operative engagement with the rear surface of the member 120 by the action of a spring 134 interposed between and engaging a collar 136 secured to the rod 133 and an abutment 135 which may be integral with the draft sills. It will here be noted that the position of the cam 127 is adapted to be varied through the operation of the member 120, rod 133, arm 132 and cam shaft 128.

Any desired type of brake equipment may be used on each car of the train. For illustrative purposes, I have shown in outline in Fig. 7, each car equipped with the ordinary type of fluid pressure brake which comprises a brake pipe, an auxiliary reservoir 137, a triple valve device 138 and a brake cylinder 139.

The foregoing description has, for the greater part, been directed to the details of the several parts of the train brake system. The following description will be directed particularly to the operation of the system.

Assuming now that the coupler 109 at the rear end of the tender is coupled to the front coupler 140 of the first car of a train of coupled cars, as shown in Fig. 7 and that the brake pipes of the locomotive, tender and cars are connected by the usual hose connections so as to form, in effect, a continuous brake pipe from end to end of the train, the equipment is charged with fluid under pressure as follows:

Fluid under pressure supplied to the main reservoir 7 in the usual manner, flows therefrom to the valve chamber 42 in the automatic brake valve device 2 through the main reservoir pipe 41, branch pipe 40 and a pipe and passage 141. From the pipe 40 fluid under pressure flows to the reducing valve device 5 and to the valve chamber 38 in the distributing valve device 1 through pipe and passage 39.

From the main reservoir pipe 41 fluid under pressure also flows to the feed valve device 4 through a branch pipe 142, to the valve chamber 93 in the control valve device 10 by way of branch pipe and passage 94, to the chamber 83 in the relay valve device 9 and to the outer seated area of the piston valve 81 of the relay valve device by way of passage 86.

In charging the system with fluid under pressure, the rotary valve 43 of the automatic brake valve device 2 is rotated by the operator to release position, in which a port 143 in the rotary valve and open to the rotary valve chamber 42 registers with the brake pipe passage 51 and with a passage 144 open to the equalizing piston chamber 47 in the brake valve device. With the port 143 in registration with the passage 51, fluid under pressure supplied from the main reservoir 7 to the rotary valve chamber 42 in the brake valve device 2, flows through the pipe 18 directly to the brake pipe 6, thus insuring the rapid charging of the brake pipe. Fluid under pressure flows from the passage 51 to the chamber 50 at the under side of the equalizing piston 46 of the brake valve device and at the same time fluid under pressure flows from the port 143 to the chamber 46 at the other side of the equalizing piston by way of passage 144. From the chamber 47, fluid under pressure flows to the equalizing reservoir 48 through passage and pipe 49. The pressures of fluid in the chambers 47 and 50 increase at substantially the same rate, so that the exhaust valve 52 is maintained seated by the force of gravity. After a predetermined period of time has elapsed, the operator rotates the rotary valve 43 from release position to running position, in which latter position, the valve is shown in Fig. 4. With the rotary valve in running position, fluid under pressure is supplied in the usual manner from the feed valve device 4 to the brake pipe 6 by way of a pipe and passage 145, a cavity 146 in the rotary valve 43, passage 51 and pipe 18. Fluid under pressure supplied to the passage 51 also flows to the chamber 50 at one side of the brake valve equalizing piston and fluid under pressure from the cavity 146 flows to the chamber 47 at the other side of the piston and to the equalizing reservoir 48, and the exhaust valve is maintained seated.

The feed valve device 4 is adapted to reduce the pressure of fluid from that carried in the main reservoir 7 to that normally carried in the brake pipe, and since, with the brake valve device 1 in running position, fluid is supplied from the feed valve device to the brake pipe, said brake pipe and chambers above mentioned, as well as the chambers in each car equipment which are open to the brake pipe, are finally charged with fluid at feed valve pressure in the usual manner.

Fluid at feed valve pressure supplied to the pipe 18 also flows to the equalizing piston chamber 17 in the distributing valve device 1, and with the equalizing piston 16 in its extreme left hand position, as shown in Fig. 4, fluid flows from the piston chamber 17 to the equalizing valve chamber 20 by way of the feed groove 26. Fluid under pressure thus supplied to the valve chamber 20 flows to the pressure chamber 24 through the passage 25. In this manner, the piston chamber 17, valve chamber 20 and pressure chamber 25 are charged with fluid at brake pipe pressure.

With the equalizing piston 16 in its extreme left hand position, the slide valves 21 and 22, which are controlled by the piston, will also be in their extreme left hand position. With the slide valve 21 in this position, the usual application chamber 147 in the distributing valve device is connected to the atmosphere by way of a passage 148, a cavity 149 in the equalizing slide valve 21, a passage and pipe 150, a cavity 151 in the rotary valve 54 of the independent brake valve device 3, passage and pipe 152, a cavity 153 in the rotary valve 43 of the automatic brake valve device 2 and an exhaust passage 154.

The piston chamber 28 in the application portion of the distributing valve device is connected to passage 150 through a passage 155, a passage 156 and cavity 149 in the equalizing slide valve 21 and is consequently open to the atmosphere.

With the application piston 27 and slide valve 35 in release position, as shown in Fig. 4, the piston chamber 74 in the relay valve device 9 is open to the atmosphere through passage 75, a pipe 157, a branch pipe and passage 158, past a ball check valve 159 of a check valve device 160, a passage and pipe 161, passage 34, valve chamber 30 in the application portion of the distributing valve device, a port 162 in the slide valve 35 and a passage 163.

With the piston 76 and slide valve 78 of the relay valve device 9 in their extreme left hand or release position, as shown in Fig. 4, the locomotive brake cylinders 12 and tender brake cylinders 13 are open to the atmosphere through pipes and passages 80, valve chamber 79 and a passage 176.

With the train stationary, the governor of the governor portion 96 of the valve device 11 will be in the position shown in Fig. 4, in which the crosshead 97 holds the valve 98 unseated so that the piston chamber 88 of the control valve device 10 is connected to the atmosphere by way of passages and pipe 100, valve chamber 99 in the governor valve device 11, past the unseated valve 98 and through a passage 164. With the piston chamber 88 thus connected to atmosphere, the pressure of fluid supplied from the main reservoir to the valve chamber 93 will cause the piston 89 to move to its extreme outer position, against the opposing pressure of the spring 90, shifting the slide valve 92. While the piston 88 is in this position, fluid under pressure flows from the valve chamber 93 to the piston chamber 88 through the small port in the piston 89 and from the chamber 93 to the atmosphere, so that there will be no build-up of pressure in the piston chamber. The flow of fluid from the chamber 93 and consequently from the main reservoir 7 through the port 95 is at such a slow rate that the usual fluid compressor (not shown) will maintain the main reservoir charged against this exhaust of fluid to the atmosphere.

As the locomotive and tender are set in motion in starting the train, the shock absorbing mechanism 105, follower plate 106 and draft yoke 107 of the coupling mechanism of the tender will move forwardly, i. e., in a direction toward the right hand, with the draft sills 102 and relative to the coupler 109, coupler shank 108 and draft key 110, until such time as the portions of the yoke which define the front ends of the key slots engage the key 110. It will here be noted that as the initial movement of the draft sills, shock absorbing mechanism and draft yoke is taking place, the coupler, coupler shank and draft key will be held substantially stationary by the resistance offered by the cars coupled to the tender, and that the springs 115 will be compressed, the value of said springs, when thus compressed, being insufficient to impart movement to the first car of the train.

Now when the front edge of the draft key 110 is engaged by the draft yoke 107, and the forward movement of the tender is continued, the shock absorbing mechanism 105 will be comporessed in the usual well known manner until such time as the cars of the train are in motion. While the shock absorbing mechanism is being compressed, the member 120 will be maintained in operative engagement with the rear face of the coupler horn 122 by the action of the spring 134. It will thus be seen that, as the draft sills move forwardly relative to the coupler 109, the rod 133 remains substantially stationary and the inner end thereof forms a substantially stationary fulcrum for the upper end of the cam operating arm 132, so that forward movement of the draft sills causes the cam 127 to rotate in a counter-clockwise direction. The cam as it is thus rotated, forces the control piston 123 inwardly and the piston in turn forces some of the liquid in the control piston chamber 130 and pipe 131 into the chamber 72 in the regulating valve device 8. The pressure of the liquid in chamber 72 causes the plunger piston 71 to move inwardly, compressing the regulating spring 73 and consequently its pressure on the piston 57 is increased.

When the coupling mechanism of the tender is subjected to maximum draft strain, the positions of the draft sills and the coupler 109 relative to each other will be substantially as shown in Figs. 1 and 2 and the several parts of the cam operating mechanism, control device 13 and plunger piston 71 will have been operated to compress the regulating spring 73 so that the maximum pressure of the spring is exerted on one side of the piston 57.

With the train in motion, the governor mechanism 96 of the valve device 11 operates to shift the crosshead 97 inwardly, permitting the spring 101 to act to seat the valve 98. With the valve 98 seated, communication from the chamber 99 and connected piston chamber 88 in the control valve device 10 is closed so that the pressure in chamber 88 will be increased by the flow of fluid from the valve chamber 93 through the port 95 in the piston. Now when the pressure of fluid in the piston chamber is substantially equal to the pressure of fluid in the valve chamber 93, the spring 90 acts to move the piston 89 and thereby the stem 91 and slide valve 92 to their innermost position. With the slide valve 92 in this position, a cavity 165 in the slide valve connects a passage and pipe 166 leading from an exhaust chamber 167 in the regulating valve device with a passage and pipe 168 leading to the independent brake valve device 3, which passage and pipe 168, when the brake valve device 3 is in running position, as shown in Fig. 4, is open to the atmosphere through a cavity 169 in the rotary valve 54 of the brake valve device and an atmospheric passage 170.

The fluid pressure supply chamber 67 in the regulating valve device 8 is open to the valve chamber 30 in the application portion of the distributing valve device 1 through a passage and pipe 171, pipe 161 and passage 34.

When it is desired to effect an application of the brakes, the rotary valve 43 of the automatic brake valve device 2 is turned from running position to service position, in which latter position, the equalizing piston chamber 47 in the brake valve device and the connected equalizing reservoir 48 are connected to the atmosphere through passage 144, a cavity 180 in the rotary valve 43 and atmospheric passage 154, thereby permitting the pressure of fluid in the piston chamber 47 and reservoir 48 to reduce below brake pipe pressure in chamber 50 at the under side of the equalizing piston. Upon such a reduction in the pressure of fluid in chamber 47, fluid at brake pipe pressure in chamber 50 causes the equalizing piston to move upwardly and unseat the brake pipe discharge valve 52, so that fluid under pressure now flows from the brake pipe to the atmosphere through pipe 18, passage 51, valve chamber 50 in the brake valve device and a passage 181.

When a reduction in brake pipe pressure is thus effected, the pressure of fluid in the equalizing piston chamber 17 in the distributing valve device 1 reduces with the brake pipe pressure, so that fluid under pressure in the valve chamber 20 and pressure chamber 24 causes the piston 16 to move in a direction toward the right hand from the position in which it is shown in Fig. 4, to service position, in which position the piston is brought to a stop by its engagement with the spring-pressed stop 19. As the piston moves toward service position, it first closes the feed groove 26 and, through the medium of the stem 23, shifts the slide valve 22 relative to the slide valve 21 to uncover a port 172 in the slide valve 21, and then through the medium of the stem 23 shifts the slide valve 21 to service position, in which the port 172 registers with one branch of the passage 156 and in which a cavity 173 connects another branch of the passage 156 to the passage 148 leading to the chamber 147. Fluid under pressure from the valve chamber 20 and pressure chamber 34 now flows to the piston chamber 28 in the application portion of the distributing valve device by way of port 172 and passages 156 and 155. From the passage 156 fluid under pressure flows to the chamber 147 by way of cavity 173 and passage 148, the chamber 147 being provided for the purpose of adding additional volume to the application piston chamber 28.

Fluid under pressure thus supplied to the application piston chamber 28 causes the piston 27 to move to its extreme right hand position, compressing the usual graduating spring mechanism 174 carried by the piston stem 32. As the piston is thus moved, it shifts the slide valve 35, through the medium of the stem 32, toward the right hand, and through the medium of the stem 32 and pin 36, also shifts the slide valve 37 toward the right hand. With the piston in its extreme right hand position, the valve 35 laps the exhaust passage 163, and a port 175 in the slide valve 37 establishes communication from the valve chamber 38 to the valve chamber 30. Fluid under pressure supplied to the valve chamber 38 from the main reservoir 7 now flows through the port 175 to the valve chamber 30 and from thence flows to the piston chamber 74 in the relay valve device 9 by way of passage 34, pipe 161, pipe and passage 171, supply valve chamber 67 in the regulating valve device 8, past the unseated supply valve 66 and its fluted stem 65, through chamber 59 and passage and pipe 75.

Fluid under pressure thus supplied to the piston chamber 74 moves the relay piston 76 in a direction toward the right hand, causing the relay piston stem 77 to shift the slide valve 78 to lap the atmospheric passage 176. After the passage 176 is thus lapped, continued movement of the relay piston 76 toward the right hand causes the piston stem 77 to engage the projection 87 of the piston valve 81 and thereby move the piston valve, against the opposing pressure of the spring 82 to unseat the valve 84 from the seat rib 85. With the valve 84 unseated, fluid under pressure flows from the main reservoir 7 to the locomotive and tender brake cylinders 12 and 13 respectively, by way of pipe 41, passage 86 in the relay valve device 9, relay valve chamber 79 and passage and pipes 80, thus effecting an application of the locomotive and tender brakes.

When a service reduction in brake pipe pressure is effected as before described, the fluid pressure brake equipment on the cars of the train will operate in the usual well known manner to apply the car brakes.

When in effecting an application of the brakes of the train, as above described, the rate of retardation of the locomotive and tender exceeds the rate of retardation of the cars, the first car of the train will tend to run in toward the rear end of the tender. When the first car does start to run in with respect to the tender, the shock absorbing mechanism operates to move the coupler 109 inwardly toward the rear end of the tender. As the coupler is thus moved, the coupler horn 122, with which the member 120 is in engagement, rocks the member in a counterclockwise direction about the pin 121, causing the rod 133 to move inwardly relative to the fixed part of the tender, compressing spring 134 and rocking the arm 132 and consequently the cam shaft 128 and cam 127 in a clockwise direction.

As the cam 127 is being thus rocked, its pressure on the piston 123 of the control device 13, as transmitted through the medium of the roller 125 and stem 124, is relieved, so that the regulating spring 73 of the regulating valve device 8 now acts to force the plunger piston 71 outwardly, displacing some of the liquid from the chamber 72 and pipe connection 131 into the chamber 130 in the control device 13, causing the piston 123 to move outwardly to maintain the roller 125 in operative contact with the surface 126 of the cam 127. As the plunger piston 71 thus moves, the regulating spring 73 expands so that its pressure on the piston 57 is decreased.

When the regulating spring pressure thus decreases on one side of the piston 57, fluid under pressure in the chamber 59 at the other side of the piston causes the piston to move outwardly against the adjusted opposing pressure of the spring. As the piston is thus being moved, the stem 58 thereof moves out of engagement with the stem 65 of the supply valve 66, permitting the spring 68 to act to seat said valve to close off the further supply of fluid under pressure from the distributing valve device 1 to the chamber 59 in the regulating valve device and relay piston chamber 74. After the supply valve 66 is seated, the piston stem 58 engages and unseats the exhaust valve 60 against the opposing pressure of the spring 61.

With the valve 60 unseated, fluid under pressure flows from chamber 59 and connected piston chamber 74 in the relay valve device 9 to the atmosphere by way of chamber 167, passage and pipe 166, cavity 165 in the slide valve of the control valve device 10, passage and pipe 168, cavity 169 in the rotary valve 54 of the independent brake valve device 3 and passage 170.

When fluid under pressure is thus vented from the relay piston chamber 74, fluid under pressure in the relay valve chamber 79 moves the relay piston 76 to its extreme outer position, as shown in Fig. 4. When the piston is being moved to this position, the stem 77 thereof is first moved out of engagement with the projection 87 of the piston valve 81, permitting the spring 83 to act to move the piston valve to seat the valve 84, after which the slide valve 78, which is shifted by the stem 77, uncovers the passage 176 leading to the atmosphere.

With the valve 84 seated, the flow of fluid under pressure from the main reservoir 7 to the relay valve chamber 79 is closed off, and with the passage 176 uncovered, fluid under pressure begins to flow from the brake cylinders 12 and 14 to the atmosphere by way of pipes and passages 80, relay valve chamber 79 and passage 176, thus initiating a release of the locomotive and tender brakes.

If, after the release of the locomotive and tender brakes is initiated, in the manner just described, the first car of the train continues to run in relative to the tender, the regulating spring pressure on the piston 57 will continue to reduce, and as a consequence, the piston 57 will remain in its outer position, so that fluid under pressure will continued to flow from the brake cylinders 12 and 14 to the atmosphere.

If, however, after the release of the locomotive and tender brakes is initiated, the locomotive and tender, due to their inertia, should start to move forwardly relative to the first car of the train, the cam 127 will be rotated in a counterclockwise direction, and through the medium of the control device 13, liquid in chamber 130, pipe connection 131 and chamber 72 and the regulating plunger piston 71, will effect an increase in the pressure of the regulating spring 73 on the regulating piston 57. The spring now acts to move the piston 57 inwardly, first seating the exhaust valve 60 and then unseating the supply valve 66. With the supply valve 66 again unseated, the relay valve device 9 operates as before described to supply fluid under pressure to the brake cylinders 12 and 14.

When the train has decelerated to some predetermined slow speed, say for instance when the train is just about to come to a stop, the speed governor portion 96 of the valve device 11 operates to shift the crosshead 97 in a direction toward the left hand, unseating the valve 98 against the opposing pressure of the spring 101.

With the valve 98 unseated, fluid under pressure is vented from the piston chamber 88 in the control valve device 10, to the atmosphere by way of passages and pipe 100, valve chamber 99 in the valve device 11, past the unseated valve 98 and through passage 164.

Upon the venting of fluid under pressure from the chamber 88, fluid under pressure in the valve chamber 93 of the control valve device 10 causes the piston to operate to its outer position, carrying the slide valve 92 with it. The slide valve in this position cuts off communication between the passages and pipes 168 and 166 and therefore closes off communication from the exhaust chamber 167 in the regulating valve device 8 to the atmosphere, so that if the exhaust valve should be unseated, flow of fluid from the chamber 59 and consequently from the piston chamber 74 of the relay valve device 9 is not permitted. Further, with the slide valve 92 in this position, fluid under pressure will be supplied from the piston chamber 30 in the application portion to the piston chamber 74 in the relay valve device 9 by way of passage 34, pipe 161, pipe 171, a branch pipe and passage 177, a cavity 178 in the control slide valve 92, a passage and pipe 179 and pipe and passage 75. Fluid under pressure thus supplied to the piston chamber 74 in the relay valve device 9 causes the device to operate to supply fluid under pressure to the brake cylinders 12 and 14 in the same manner as before described and an application of the locomotive and tender brakes will be effected without regulation by the regulating valve device 8.

To limit the degree of reduction in brake pipe pressure, the rotary valve 43 of the automatic brake valve device is rotated from service position to lap position closing off the further exhaust of fluid from the equalizing piston chamber 47 in the brake valve device. After the reduction in the pressure of fluid in the chamber 47 is thus stopped, the brake pipe pressure in chamber 50 continues to reduce until it becomes substantially equal to or slightly less than the pressure of fluid in chamber 47, at which time the equalizing piston 46 acts to seat the discharge valve 52 in the usual manner, thus preventing further reduction in brake pipe pressure.

Now when the pressure of fluid in the equalizing valve chamber 20 of the distributing valve device 1 reduces into the application piston chamber 28 by way of port 172, and passages 156 and 155, and into the chamber 147 through passage 156, cavity 173 and passage 148, to a degree slightly less than the pressure of fluid in equalizing piston chamber 17, the pressure of fluid in this chamber 17 causes the piston 16 to move to shift the valve 22 to lap the passage 172, thereby limiting the degree of pressure obtained in the application piston chamber 28.

When the pressure of fluid flowing to the chamber 29 by way of passages 34 and 33, is slightly greater than the pressure of fluid in the application piston chamber 28, the application piston is moved in a direction toward the right hand, shifting the slide valve 35 to lap position, thus closing off the further flow of fluid under pressure from the valve chamber 30 to the supply valve chamber 67 in the regulating valve device 8 and consequently to the relay piston chamber 74. When the brake cylinder pressure in the relay valve chamber 79 becomes substantially equal to the pressure of fluid in the piston chamber 74, the spring 82 acts to move the piston valve 81 to seat the valve 84 and close off the further flow of fluid to the brake cylinders, thus the degree of brake cylinder pressure is limited. As the valve piston thus moves, it moves the relay piston and slide valve 78 outwardly, but not far enough that the slide valve uncovers the passage 176.

If, when the several parts of the relay valve device 9 are in their lap position, the first car of the train should start to run in on the tender, the regulating valve device 8 will be caused to operate to reduce the pressure of fluid in the relay piston chamber 74, and when such a reduction is effected, the relay piston and slide valve 78 will move to their release position, as shown in Fig. 4, and fluid under pressure will be discharged from the brake cylinders 12 and 14 to the atmosphere in accordance with the degree of reduction in the relay piston chamber 74.

The pressure of fluid in the chamber 59 of the regulating valve device 8 and in the relay piston chamber 74 reduce together and when the pressure of fluid in the chamber 59 is slightly less than the pressure of the regulating spring 73, said spring acts to move the piston 57 inwardly, permitting the valve 60 to seat and close off the further release of fluid from the chambers 59 and 74, the piston 57 coming to a stop before the stem thereof engages the stem of the seated supply valve 66. When the valve 60 seats the relay piston 76 and valve 78 will come to a stop in lap position.

Now if the locomotive should move forwardly relative to the first car of the train, the regulating valve device 8 will be caused to operate to again establish communication from the valve chamber 30 in the distributing valve device to the relay piston chamber 74 and the flow of fluid through this communication to the relay piston chamber 74 effects a reduction in the pressure of fluid in the chamber 30. Upon such a reduction in valve chamber 30, the application piston will move to application position and fluid under pressure will again be supplied from the main reservoir to the relay piston chamber 74, causing the relay valve device to again function to supply fluid under pressure to the brake cylinders 12 and 14.

If the rotary valve 43 of the automatic brake valve device is turned to emergency position, a cavity 182 in the valve connects the brake pipe passage 51 directly to the passage 154 leading to the atmosphere which permits a sudden reduction in brake pipe pressure to occur to effect an emergency application of the brakes on the train.

This sudden reduction in brake pipe pressure causes the several parts of the distributing valve device 1 to operate to supply fluid under pressure to the supply valve chamber 67 in the regulating valve device 8 in substantially the same manner as described in connection with a service application of the brakes. The regulating valve device 8, relay valve device 9 and control valve device 10 will now function to control the locomotive and tender brake cylinder pressure in substantially the same manner as before described in connection with a service application of the brakes.

To release the brakes after an application of the brakes has been effected, the rotary valve 43 of the automatic brake valve device 2 is first turned to release position and then to running position to charge the brake pipe 6 by way of passage 51 and pipe 18 as before described in connection with the initial charging of the system.

Fluid under pressure supplied to the pipe 18 also flows to the equalizing piston chamber 17 of the distributing valve device 1, causing the equalizing piston to move to its inner position, as shown in Fig. 4, in which position, fluid under pressure in the application piston chamber is discharged to the atmosphere by way of passages 155 and 156, cavity 149 in the slide valve 21 of the equalizing portion, passage and pipe 150, cavity 151 in the rotary valve 54 of the independent brake valve device 3, passage and pipe 152, cavity 153 in the rotary valve 43 of the automatic brake valve device 2 and passage 154. Fluid in the application valve chamber 30 now causes the application piston 27 to move to its outer position, shifting the slide valve 35 to uncover the atmospheric passage 163.

With the passage 163 uncovered, fluid under pressure in the relay piston chamber 74 and chamber 59 in the regulating valve device 8 is vented to the atmosphere by way of passage 75, pipes 157 and 158, past the ball check valve 159, pipe 161, passage 34, valve chamber 30 in the application portion of the distributing valve device 1 and passage 163.

Upon the venting of fluid under pressure from the relay piston chamber 74, fluid at brake cylinder pressure in valve chamber 79 of the relay valve device 9 moves the relay piston 76 and slide valve 78 to their outer position, in which fluid under pressure is discharged to the atmosphere by way of pipe and passage 80, valve chamber 79 and passage 176, thus releasing the locomotive and tender brakes.

On short trains where the train slack is negligible and is not liable to cause severe shocks when gathering, the regulating valve device 8 may be rendered ineffective to control the brake cylinder pressure on the locomotive and tender and for this purpose a cut-out cock device 183 is provided having a plug valve 184 adapted to be turned by a handle 185. When it is desired to render the regulating valve device 8 ineffective, the plug valve 184 of the cock device is rotated to a position in which a passage 186 in the valve connects a pipe and passage 187 leading to the chamber in the check valve device 160 containing the ball check valve 159 to a pipe 188 open to the passage and pipe 158.

Now when the application portion of the distributing valve is caused to operate to application position, fluid under pressure is supplied from the application valve chamber 30 in the distributing valve device to the piston chamber 74 in the relay valve device 9 by way of passage 34, pipe 161, valve chamber of the check valve device 160, passage and pipe 187, passage 186 in the cut-out cock device 183, pipe and passage 188, pipes 158 and 157 and passage 75 and the relay valve device will be caused to operate to effect an application of the locomotive and tender brakes. It will thus be seen that with the cut-out valve in cut-out position, the regulating valve device 8 will be rendered ineffective to control the locomotive and tender brakes when an automatic application of the brakes is effected.

When it is desired to effect an application of the locomotive and tender brakes only, the rotary valve 54 of the independent brake valve device 3 is rotated to application position, in which a port 189 in the rotary valve connects the rotary valve chamber 53 to the passage and pipe 168 and to a passage and pipe 190 open to the passage 156 in the distributing valve device 1.

Fluid under pressure supplied to the rotary valve chamber 53 from the reducing valve device 5 through a pipe and passage 191 now flows to the application piston chamber 28 in the distributing valve device by way of port 189, passage and pipe 190, passage 156, and passage 155. Fluid under pressure thus supplied to the piston chamber 28 causes the piston 27 to move to its inner position, shifting the slide valve 35 to close the communication from the valve chamber 30 to the passage 163 open to the atmosphere.

Fluid supplied to the rotary valve chamber 53 also flows to the piston chamber 74 in the relay valve device 9 by way of port 189 in the rotary valve 54, passage and pipe 168, a branch pipe 192, past a ball check valve 193 of a check valve device 194, pipe 157 and passage 75, causing the relay piston 76 to move to its inner position, shifting the slide valve 78 to lap the passage 181 leading to the atmosphere, and then actuating the piston valve 81 to unseat the valve 84. With the valve 84 unseated, fluid under pressure flows from the main reservoir 7 to the brake cylinders by way of pipe 41, passage 86, past the unseated valve 84, valve chamber 79 and passage and pipe 80.

When the piston 27 of the application portion of the distributing valve device is moved to application position as above described, it causes the slide valve 37 to be shifted to its extreme right hand position, in which fluid under pressure from the valve chamber 38 is supplied to the valve chamber 30 by way of port 175 in the slide valve.

When the pressure of fluid in valve chamber 30 becomes substantially equal to the pressure of fluid in the piston chamber 28, as supplied by the reducing valve device 5, the graduating spring mechanism 174 causes the piston 27 to move toward the left hand, shifting the slide valve 37 to lap position, in which the flow of fluid from the chamber 38 to the valve chamber 30 is closed off. When the piston 26 and stem 32 are in lap position, the slide valve 35 which has been shifted by the stem still maintains the atmospheric passage 163 closed.

Now when the brake cylinder pressure present in valve chamber 79 of the relay valve device 9 is substantially equal to the pressure of fluid in the relay piston chamber 74, the spring 82 acts to move the piston valve 81 to seat the valve 84, thus closing off the further flow of fluid to the brake cylinders 12 and 14.

It will be noted that when an application of the locomotive and tender brakes is effected through the manipulation of the independent brake valve device 3, the regulating valve device 8 and control valve device 10 are ineffective to control the pressure of fluid in the brake cylinders 12 and 14.

To release the brakes after an independent application has been effected, the rotary valve 43 of the independent brake valve device 3 is turned to release position, in which a cavity 196 connects the passage and pipe 190 to the passage 170 leading to the atmosphere, thus venting fluid under pressure from the application piston chamber 28 in the distributing valve device.

With the chamber 28 thus vented, fluid under pressure in the valve chamber 30 causes the piston 27 to move to its outer position, shifting the slide valve 35 to release position, in which the slide valve uncovers the passage 163. Fluid under pressure now flows from the piston chamber 74 in the relay valve device 9 to the atmosphere by way of passage 75, pipe 157, pipe 158, past the ball check valve 159 of the check valve device 160, pipes 161 and 155, passage 34 in the distributing valve device, valve chamber 30 and passage 163. When the relay piston chamber 74 is thus opened to the atmosphere, the several movable parts of the relay valve device 9 operate, as before described, to vent fluid under pressure from the brake cylinders 12 and 14, thus effecting the release of the brakes.

In Fig. 8, a modification of the speed controlled valve mechanism is illustrated which comprises a magnet winding 197 connected in series with a source of current such as a battery 198 and also comprises a switch 199 operative by the speed governor mechanism to open or close the circuit through said winding and source of current.

When the train is moving at some predetermined slow speed or is at a stop, the mechanism 96 operates the switch 199 to open the circuit through the magnet winding, thus deenergizing the winding. When the magnet winding is deenergized, a spring 200 acts to unseat an exhaust valve 201, permitting fluid under pressure to flow from the pipe and passage 100 to the atmosphere by way of a passage 202 in the magnet valve device, which causes the control valve device 10 to operate to render the regulating valve device 8 ineffective to control the locomotive and tender brakes.

When the train is moving at a speed higher than said predetermined low speed, the governor mechanism 96 operates the switch 199 to close the circuit through said source of current and magnet winding, effecting the energization of the winding. Upon energization of the winding, the valve 201 is caused to seat, thus closing off the communication from the passage and pipe 100 to the atmosphere. With the valve 201 seated, the piston 89 of the control valve device 10 will be caused to move to its inner position and again render the regulating valve device 8 effective to control the pressure of fluid in the brake cylinders 12 and 14.

It will here be understood that instead of controlling the operation of the regulating valve device 8 by hydraulic means, it may be controlled electrically or mechanically in the same manner as shown and described in my prior application, filed July 23, 1931, Serial No. 552,633.

From the foregoing description, it will be seen that when the train is moving at a speed greater than a predetermined slow speed and a brake pipe reduction is initiated, that the regulating valve device 8 will regulate the brake cylinder pressure on the locomotive and tender in accordance with relative longitudinal movement between the tender and the first car of the train and that this regulation will continue until such time as the train is almost stopped, when the brakes on the locomotive will be automatically applied with full force and without regulations by the regulating valve device 8.

In this specification, I have described my equipment as being carried by the locomotive and tender, but I do not wish to be limited to this for it will be readily understood that the equipment may be carried by any other train power unit not having a tender such, for instance, as an electric locomotive, a motor car or the like.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. The combination in a train of at least two vehicles, of a brake equipment on one of said vehicles, means included in said equipment operative according to the speed of the train and according to a relative movement between said vehicles to effect a regulated application of the brakes on the vehicle, and means for controlling the operation of the first mentioned means.

2. The combination in a train of at least two vehicles, of a brake equipment on one of said vehicles, means included in said equipment operative according to a relative movement between said vehicles to effect a regulated application of the brakes on the vehicle and operative automatically according to the speed of the train to effect an application of the brakes without regulation, and means for controlling the operation of the first mentioned means.

3. The combination in a train of at least two vehicles, of a brake equipment on one of said vehicles, means included in said equipment operative upon initiating an application of the brakes and according to a relative movement between said vehicles for varying the braking action of the equipment, and means operative according to the speed of the train for rendering the first mentioned means either effective or ineffective to vary the braking action of said equipment.

4. The combination in a train of at least two vehicles, of a brake equipment on one of said vehicles, means included in said equipment operative upon initiating an application of the brakes and according to a relative movement between said vehicles for varying the braking action of the equipment, and means operative according to the speed of the train for rendering the first mentioned means either effective or ineffective to vary the braking action of said equipment and to effect an application of the brakes without regulation when the first mentioned means is rendered ineffective.

5. In a brake system for a train of one or more cars and a power vehicle, the combination with a brake equipment, of means included in said equipment operative automatically, in effecting an application of the brakes, according to a relative movement between the power vehicle and a car of the train for varying the braking action of the equipment, and means also included in said equipment operative according to the speed of the train for rendering the first mentioned means either effective or ineffective to vary the braking action of the equipment.

6. The combination in a train of at least two vehicles, of a brake equipment on one of said vehicles, means included in said equipment operative upon initiating an application of the brakes and according to a relative movement between said vehicles for varying the braking action of the equipment, and means operative when the train is decelerated to a predetermined low speed for rendering the first mentioned means ineffective to vary the braking action of said equipment.

7. The combination in a train of at least two vehicles, of a brake equipment on one of said vehicles, means included in said equipment operative upon initiating an application of the brakes and according to a relative movement between said vehicles for varying the braking action of the equipment, and means operative while the speed of the train is greater than a predetermined low speed to render the first mentioned means effective to vary the braking action of the equipment and operative when the train is decelerated to said predetermined low speed to render the first mentioned means ineffective to control the braking action.

8. The combination in a train of at least two vehicles, of a brake equipment on each of said vehicles, means for initiating the operation of the brake equipments on both of said vehicles to effect an application of the train brakes, means operated automatically upon relative movement between said vehicles for regulating the braking action of the equipment on one vehicle, and valve means operated according to the speed of the train for rendering the second mentioned means either effective or ineffective to regulate the braking action on the last mentioned vehicle.

9. The combination in a train of at least two vehicles, of a brake equipment on each of said vehicles, means for initiating the operation of the brake equipments on both said vehicles to effect an application of the train brakes, means operated automatically upon relative movement between said vehicles for either increasing or decreasing the braking force of the equipment on one vehicle, and means operated automatically upon the deceleration of the train to a predetermined low speed for increasing the braking force of the equipment on said vehicle and for rendering the second mentioned means ineffective to vary the braking force of the equipment on said vehicle.

10. The combination in a train of at least two vehicles, of a brake equipment on each of said vehicles, means for initiating the operation of the brake equipments on both of said vehicles to effect an application of the train brakes, means operated automatically upon relative movement between said vehicles for either increasing or decreasing the braking force of the equipment on one vehicle, and means operated automatically until the train is decelerated to a predetermined low speed, and means operative automatically upon the deceleration of the train to said low speed for effecting an increase in the braking force of the equipment on said vehicle and for rendering the second mentioned means ineffective to vary the braking force of the equipment on said vehicle.

11. The combination in a train of at least two vehicles, of means coupling said vehicles to each other, the coupling means being movable longitudinally relative to at least one vehicle, a fluid pressure brake system operative to effect an application of the brakes on the train, and means operated upon a relative movement between the coupling means and said vehicle and according to the speed of the train for regulating the braking action of the portion of the system on said vehicle.

12. The combination in a train of at least two vehicles, of means coupling said vehicles to each other, the coupling means being movable longitudinally relative to at least one vehicle, a fluid pressure brake system operative to effect an application of the brakes on the train, means adjusted by the coupling means when the coupling means is moved longitudinally relative to said vehicle for controlling the braking action of the portion of the system on said vehicle, and means operative according to the speed of the train to render the first mentioned means either effective or ineffective to control the braking action of the portion of the system on said vehicle.

13. The combination in a train of at least two vehicles, of a brake equipment on each of said vehicles, manually controlled means on one vehicle for initiating the operation of the brake equipments on both of said vehicles to effect an application of the brakes on both vehicles, and means operative upon a relative movement between said vehicles only when the speed of the train exceeds a predetermined degree for varying the braking action of the equipment on said vehicle.

14. The combination in a train of at least two vehicles, of a brake equipment on each of said vehicles, manually controlled means on one vehicle for initiating the operation of the brake equipments on both of said vehicles to effect an application of the brakes on both vehicles, and means operative upon a relative movement between said vehicles only when the speed of the train exceeds a predetermined degree for varying the braking action of the equipment on said vehicle and operative when the speed of the train is reduced to said predetermined speed for applying the brakes on said vehicle without regulation.

15. In a fluid pressure brake system for a train of one or more cars and a power vehicle, the combination with a brake pipe, of means on said car or cars operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train only while the speed of the train exceeds a predetermined degree for controlling the operation of said valve means to vary the action of the power vehicle brakes.

16. In a fluid pressure brake system for a train of one or more cars and a power vehicle, the combination with a brake pipe, of means on said car or cars operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on said power vehicle, and means operative according to the speed of the train for rendering said valve means either effective or ineffective to vary the braking force on the power vehicle.

17. In a fluid pressure brake system for a train of one or more cars and a power vehicle, the combination with a brake pipe, of means on said car or cars operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on said power vehicle, and means operative according to the speed of the train for rendering said valve means either effective or ineffective to vary the braking force on the power vehicle and for effecting an increase in the braking power on the power vehicle when the valve means is rendered ineffective.

18. In a fluid pressure brake system for a train of one or more cars and a power vehicle, the combination with a brake pipe, of means on the car or cars of the train operated upon a reduction in brake pipe pressure for effecting an application of the car brakes, a distributing valve device operated upon said reduction in brake pipe pressure for supplying fluid under pressure to effect an application of the power vehicle brakes, valve means operated according to relative movement between the power vehicle and an adjacent car of the train for increasing or decreasing the braking force on the power vehicle, a valve device having one position for rendering said valve means effective to vary the braking force on the power vehicle and having another position for rendering said valve means ineffective to vary the braking force on the power vehicle, and means operated according to the speed of the train for controlling the operation of said valve device.

19. In a fluid pressure brake system for a train of one or more cars and a power vehicle, the combination with a brake pipe, of means on said car or cars operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for varying the braking action of the equipment on the power vehicle, a valve device operative to render said valve mechanism either effective or ineffective to vary the braking action of the equipment on the power vehicle, and means operating according to the speed of the train for controlling the operation of said valve device.

20. The combination in a train of at least two vehicles, of a brake equipment on one of said vehicles, means included in said equipment operative upon initiating an application of the brakes and according to a relative movement between said vehicles for varying the braking action of the equipment, valve mechanism operative to one position for rendering said means effective to vary the braking action of the equipment and operative to another position for rendering said means ineffective to vary the braking action of the equipment, and means controlled according to the speed of the train for controlling the operation of said valve mechanism.

21. The combination in a train of at least two vehicles, of a brake equipment on one of said vehicles, means included in said equipment operative upon initiating an application of the brakes and according to a relative movement between said vehicles for varying the braking action of the equipment, valve mechanism operative to render said means either effective or ineffective to vary the braking action of the equipment, and a valve operated according to the speed of the train for controlling the operation of said valve mechanism.

22. The combination in a train of at least two vehicles, of a brake equipment on each of said vehicles, means for initiating the operation of the brake equipments on both of said vehicles to effect an application of the train brakes, means operated automatically upon relative movement between said vehicles for regulating the braking action of the equipment on one vehicle, valve mechanism operative to render the second mentioned means either effective or ineffective to vary the braking action of the equipment on said vehicle, and valve means operated according to the speed of the train for controlling the operation of said valve mechanism.

23. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and operative to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, valve means operated according to relative movement between the power vehicle and the adjacent car of the train for controlling the supply of fluid under pressure to and the release of fluid under pressure from the valve device, a control valve device operative to render said valve mechanism either effective or ineffective to control the supply of fluid under pressure to and the release of fluid under pressure from said valve device, and means operated according to the speed of the train for controlling the operation of said control valve device.

24. In a fluid pressure brake system for a train of one or more cars and a power vehicle, the combination with a brake pipe, of means on said car or cars operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for varying the braking action of the equipment on the power vehicle, a valve device operative to render said valve mechanism either effective or ineffective to vary the braking action of the equipment on the power vehicle, electrically operated means for controlling the operation of said valve device, and means operated according to the speed of the train for controlling the operation of said electrically operated means.

25. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and operative to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, valve means operated according to relative movement between the power vehicle and the adjacent car of the train for controlling the supply of fluid under pressure to and the release of fluid under pressure from the valve device, a control valve device operative to render said valve mechanism either effective or ineffective to control the supply of fluid under pressure to and the release of fluid under pressure from said valve device, electrically operated means for controlling the operation of said control valve device, and means operated according to the speed of the train for controlling the operation of said electrically operated means.

26. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and operative to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, valve means operated according to relative movement between the power vehicle and the adjacent car of the train for controlling the supply of fluid under pressure to and the release of fluid under pressure from the valve device, a control valve device operative to render said valve mechanism either effective or ineffective to control the supply of fluid under pressure to and the release of fluid under pressure from said valve device, electrically operated means for controlling the operation of said control valve device, and a switch operated according to the speed of the train for controlling the operation of said electrically operated means.

CLYDE C. FARMER.